United States Patent [19]

Chu

[11] Patent Number: 4,822,576

[45] Date of Patent: Apr. 18, 1989

[54] REMOVAL OF HYDROGEN SULFIDE FROM A CARBON DIOXIDE CONTAINING GAS MIXTURE

[75] Inventor: Humbert H. Chu, Houston, Tex.

[73] Assignee: Shell Oil Company, Houston, Tex.

[21] Appl. No.: 114,165

[22] Filed: Oct. 27, 1987

[51] Int. Cl.$^4$ .............................................. B01D 53/14
[52] U.S. Cl. .................................... 423/228; 423/229
[58] Field of Search ................................ 423/229, 228

[56] References Cited

U.S. PATENT DOCUMENTS 3,266,866  8/1966  Bally et al. ........................... 423/229
4,085,192  4/1978  Van Scoy ............................. 423/228

OTHER PUBLICATIONS

Gas Purification, 3rd ed. Kohl et al. Gulf Publishing Co. 1979, pp. 28, 32, 38–40.

Primary Examiner—John Doll
Assistant Examiner—Jeffrey Edwin Russel

[57] ABSTRACT

Gas mixtures containing a substantial amount of $CO_2$ are treated to remove $H_2S$ by using a selective solvent containing $CO_2$, usually obtained by understripping loaded solvent during regeneration.

7 Claims, No Drawings

REMOVAL OF HYDROGEN SULFIDE FROM A CARBON DIOXIDE CONTAINING GAS MIXTURE

BACKGROUND OF THE INVENTION

1. Field of the Invention

The present invention relates to a process for the purification of a gas mixture comprising a substantial amount of carbon dioxide by removal of hydrogen sulfide.

2. Description of the State of the Art

In the purification of gas mixtures, e.g., natural gas, by absorption to remove minor amounts of undesirable contaminants, it is desirable for highest gas purification to regenerate the absorbent to expel as much as possible of the contaminants to provide the leanest possible absorbent for recycle.

In conventional methods of purification of gas mixtures containing carbon dioxide and hydrogen sulfide, both gases are cosorbed by the absorbent (as high as 90% of the $CO_2$ from natural gas) and in the desire to provide lean solvent recycle both are expelled to the greatest extent possible on regeneration, usually by steam stripping. This is true even when the gas to be treated comprises a major amount of carbon dioxide or is principally carbon dioxide gas.

It is desirable to effectively remove hydrogen sulfide from a gas mixture comprising a major amount of carbon dioxide without the cosorption of large amounts of carbon dioxide. It is also desirable (1) to reduce the operating temperatures of the absorption unit resulting in more selective hydrogen sulfide removal and (2) to reduce any steam requirements for regeneration of sorbent solution.

SUMMARY OF THE INVENTION

The present invention is directed to a process for the removal of hydrogen sulfide from a gas mixture comprising a substantial amount of carbon dioxide which comprises (a) contacting the gas mixture with an absorbent for hydrogen sulfide; (b) regenerating the loaded absorbent to remove substantially all of the hydrogen sulfide and most of the carbon dioxide to provide a lean absorbent containing carbon dioxide in an amount of from 0.2% w to 2.0% w; and (c) recycling the lean absorbent to the contacting step (a).

Use of the above process unexpectedly results in reducing the steam requirements in absorbent regeneration, reducing the temperature rise in absorption, increasing the rate of removal of hydrogen sulfide and reducing the cosorption of carbon dioxide.

The process of the invention is useful for any applications of conventional absorbent which can be used to absorb hydrogen sulfide in the presence of substantial amounts of carbon dioxide. For example, sorbents include lower aliphatic tertiary amines, lower alkanols, polyols, polyalkylene glycols and their mono- or dialkyl ethers, amines, sulfones, sulfoxides, N-heterocyclics, O-heterocyclic, aromatic hydrocarbons and the like containing up to 10 carbon atoms, including mixtures with each other and/or with water, such as methyl diethanol amine, tri-ethanol amine, dimethylformamide, glycerol, methanol, diethylene glycol, triethylene glycol, sulfolane, N-methylpyrrolidone, 2-pyrrolidone, N-methyl-3-morpholone, N-methylpiperidone, dioxolane, dioxane, benzene, toluene, ethylbenzene and the like. In one embodiment of the invention, the solvent is an aliphatic tertiary amine or aqueous solution thereof, and, preferably a lower alkanol amine, such as ethyl diethanol amine, triethanol amine or, preferably, methyl diethanol amine and, especially aqueous solutions containing from about 10% w to about 75% w of tertiary amine and, preferably from about 25% w to about 75% w, as the later cosorb the lowest amount of $CO_2$ while effectively removing $H_2S$.

The sorption is conducted under conventional contacting conditions of temperature, pressure and vessel, flow designs and rates used in the gas purification art. The temperature and pressure of the sorption are not critical and are conventionally known in the gas treating art. By way of illustration, the temperature is conveniently above 120° F. and the pressure can be above atmospheric, such as 5–300 p.s.i.g. Lower and higher conventional conditions are not excluded.

The loaded solvent is regenerated (desorbed) in a conventional manner, usually by transfer to a separate regeneration zone or vessel. Substantially all of the $H_2S$ removed from the loaded solvent by regeneration, while still leaving in the solvent the desired amount of $CO_2$ defined by the invention, will vary to some degree based on the method of regeneration used and the operating conditions thereof and will usually be less than a few hundred p.p.m. by w of $H_2S$ in the recycle solvent. Regeneration usually involves heating the solvent preferably under reduced pressure and/or inert gas ($N_2$) or steam sparging of the solvent and the like. In one embodiment of the invention, the solvent is regenerated by steam stripping in which moisture remains in a closed cycle in the stripper. The desired amount of $CO_2$ in the solvent can be provided or maintained in the sorbent recycle by controlling the regeneration process to "understrip" $CO_2$ from the "lean" sorbent. In steam regeneration, this is readily accomplished by lowering the reboiler steam rate to leave the desired amount of $CO_2$ in the solvent while still being able to achieve sufficient $H_2S$ stripping of the gas stream. In one embodiment of the invention, the steam rate is from about 0.5 to about 1.5 lb of steam/gal and, preferably, from about 0.5 to about 1.0 lb of steam per gallon of solvent. Preferably, the amount of $CO_2$ in the solvent recycle from regeneration is from about 0.2% w to about 1.5% w, and especially from about 0.2% w to about 1.5% w.

Another embodiment of the invention is a process for reducing the steam requirements while substantially maintaining the absorption rate of hydrogen sulfide from a gas mixture comprising a major amount of carbon dioxide which process comprises (a) contacting the gas mixture with an absorbent for hydrogen sulfide, (b) regenerating the loaded absorbent by contacting it with an amount of steam sufficient to remove substantially all of the hydrogen sulfide and most of the carbon dioxide to provide a lean absorbent containing carbon dioxide in an amount of from about 0.2% w to about 2.0% w and (c) recycling the lean absorbent from step (b) to the contacting step (a).

In this additional embodiment, the process conditions, including absorbents, $CO_2$ content, regeneration, temperatures, pressures, flow rates and the like are as previously disclosed above.

While the invention has been illustrated with tray contact absorption and regeneration zones and corresponding apparatus, those skilled in the art will appreciate that, except where specified, other equivalent or analogous units may be employed. The terms "steps" or "zones," as employed in the specification and claims, includes where suitable, the use of segmented equipment operated in series, or the division of one unit into multiple units because of size constraints, etc. For example, for fully continuous operation, an absorption column might comprise two separate columns in which the solution from the lower portion of the first column would be introduced into the upper portion of the second column, the gaseous material from the upper portion of the second column being fed into the lower portion of the first column. Parallel operation of units, is of course, well within the scope of the invention.

The gas mixture to be treated comprises a substantial amount of carbon dioxide, e.g., more than 20–50% v $CO_2$, which can be from a variety of conventional sources, including natural gas, fuel gas, synthesis gas and the like. In one embodiment of the invention, the gas mixture is substantially $CO_2$, e.g., at least 80% v or especially at least 90% v $CO_2$. Such $CO_2$ gas is often produced from subterranean $CO_2$ reservoirs and, after purification and dehydration, is used as an injection fluid for secondary or tertiary oil recovery processes.

ILLUSTRATIVE EMBODIMENT

The following embodiments are provided to illustrate the invention but should not be regarded as limiting it in any way.

EMBODIMENT 1

A recycle gas stream containing about 90% v $CO_2$ and 420 ppm by weight $H_2S$ was subjected to conventional selective absorption using an aqueous solution of 50% w of methyl diethanol amine at 50° F. and 275 psig. The loaded solvent was subjected to steam stripping in a conventional regenerator.

TWO OPERATING PERIODS WITH DIFFERENT $CO_2$ LOADINGS IN SOLVENT

During the first experiment A, the $CO_2$ loading in the lean solvent was adjusted to higher than normally used in an industrial gas treating plant by use of a lower steam rate. In the second experiment B, the $CO_2$ loading came within the range of commercial values. Table 1 presents the two sets of experimental data collected from the two experimental periods (A and B) mentioned above. Experiment A represents the invention of the use of the higher $CO_2$ loaded solvent and Experiment B represents a conventional case of fully stripped solvent. Process conditions of the two experiments were basically the same except that the reboiler steam consumption in Experiment A was about 35% lower than the steam used in Experiment B. The absolute bulge temperature is the temperature in degrees F at which maximum absorption takes place.

TABLE 1

Higher $CO_2$ Loaded Solvent Reduces $CO_2$ Cosorption and Improves $H_2S$ Removal in $CO_2$ Stream (Low L/V Case)

|  | Experiment A Higher $CO_2$ Loaded Solvent | Experiment B Fully Stripped Solvent |
|---|---|---|
| Feed Gas |  |  |
| Feed gas rate, Mscfd | 79 | 71 |
| $H_2S$ content, ppmm | 420 | 525 |
| $CO_2$ content, % v | 89.8 | 90.1 |
| Process Conditions |  |  |
| Asorber trays | 8 | 8 |
| Stripper trays | 14 | 14 |
| L/V, gpm/MMscfd | 5.6 | 5.8 |

TABLE 1-continued

Higher $CO_2$ Loaded Solvent Reduces $CO_2$ Cosorption and Improves $H_2S$ Removal in $CO_2$ Stream (Low L/V Case)

|  | Experiment A Higher $CO_2$ Loaded Solvent | Experiment B Fully Stripped Solvent |
|---|---|---|
| Lean Solvent Feed |  |  |
| Solvent rate, gpm | 0.44 | 0.41 |
| $H_2S$ loading, ppmw | 420 | 187 |
| $CO_2$ loading, % w | 1.20 | 0.05 |
| Reboiler Steam Rate |  |  |
| lbs/gal | 1.30 | 2.04 |
| energy saving, % | 35 | base |
| Treated Gas |  |  |
| $H_2S$ content, ppmm | 108 | 156 |
| % $CO_2$ cosorption | 4.00 | 8.09 |
| Abs. bulge T, °F. | 136 | 160 |

In conventional gas treating, lowering the reboiler steam rates reduces the effectiveness of solvent stripping which results in poorer $H_2S$ removal. The presence of $CO_2$ in the lean solvent usually increases the partial pressure of $H_2S$ in the treated gas. Therefore, the higher the $CO_2$ loading in the lean solvent, the higher the residual $H_2S$ content in the treated gas.

The data in Table 1 show that although Experiment A has a lower steam rate and a significantly higher $CO_2$ loading in the lean solvent, it does better in $H_2S$ removal. Further analysis of the data shows that the high $CO_2$ loading in the lean solvent (Experiment A) as a result of solvent understripping has resulted in a reduction of $CO_2$ cosorption. This reduction in $CO_2$ cosorption caused a reduction in the temperature rise of the solvent, which in turn has helped the $H_2S$ removal. As shown in Table 1, the absorber bulge temperature (T) for Experiment A is 136° F. as compared to the higher 160° F. bulge temperature in Experiment B. The effect of a decrease in temperature rise has overridden the effect of an increase in solvent $CO_2$ loading on the residual $H_2S$ content in the treated gas.

Based on the above data, the higher $CO_2$ loading (by understripping of solvents) is advantageous to the conservation of stripping energy. By purposely providing higher $CO_2$ loading in the lean solvent, one can achieve at least the same degree of $H_2S$ removal with lower $CO_2$ cosorption. In Experiments A and B, this was demonstrated with a 35% reduction in reboiler steam rate when $CO_2$ content of the lean absorbent was increased. The amount of $CO_2$ cosorption in Experiment A, with an order of magnitude higher $CO_2$ loading in the "lean" solvent, is 50% lower than that of Experiment B. Additional energy savings can also be realized from the lower $CO_2$ recompression energy requirement.

EMBODIMENT 2

Table 2 presents a second set of data (higher L/V ratios) which again demonstrates the benefit of understripping solvent. $CO_2$ cosorption and comparable $H_2S$ removal were achieved with higher $CO_2$ loading in the lean solvent. In this case, it translates to a 62% saving in reboiler steam consumption.

TABLE 2

Higher $CO_2$ Loaded Solvent Reduces $CO_2$ Cosorption and Improves $H_2S$ Removal in $CO_2$ Stream
(High L/V Case)

|  | Experiment A Higher $CO_2$ Loaded Solvent | Experiment B Fully Stripped Solvent |
|---|---|---|
| Feed Gas | | |
| Feed gas rate, Mscfd | 43 | 49 |
| $H_2S$ content, ppmm | 600 | 525 |
| $CO_2$ content, % v | 95.7 | 89.2 |
| Process Conditions | | |
| Absorber trays | 6 | 6 |
| Stripper trays | 14 | 14 |
| L/V, gpm/MMscfd | 10.4 | 10.0 |
| Lean Solvent Feed | | |
| Solvent rate, gpm | 0.65 | 0.72 |
| $H_2S$ loading, ppmw | 292 | 138 |
| $CO_2$ loading, % w | 0.3 | 0.0072 |
| Reboiler Steam Rate | | |
| lbs/gal | 0.71 | 1.91 |
| energy saving, % | 62 | base |
| Treated Gas | | |
| $H_2S$ content, ppmm | 17 | 6 |
| % $CO_2$ cosorption | 12 | 14 |
| Abs. bulge T, °F. | 103 | 119 |

What is claimed is:

1. A process for the removal of hydrogen sulfide from a gas mixture comprising at least 80% v of carbon dioxide which comprises (a) contacting the gas mixture with an aliphatic tertiary amine or an aqueous solution thereof as an absorbent for hydrogen sulfide: (b) regenerating the loaded absorbent to remove substantially all of the hydrogen sulfide and most of the carbon dioxide to provide a lean absorbent containing carbon dioxide in an amount of from 0.2% w to 2% w; and (c) recycling the lean absorbent to the contacting step (a).

2. A process according to claim 1 wherein the absorbent is a lower alkanol amine containing up to 10 carbon atoms or an aqueous solution thereof.

3. A process according to claim 2 wherein the absorbent is methyl diethanol amine or an aqueous solution thereof.

4. A process according to claim 3 wherein the absorbent is an aqueous solution of methyl diethanolamine containing from 10% w to 75% w of the amine.

5. A process according to claim 1 wherein the loaded absorbent is regenerated by steam stripping.

6. A process according to claim 5 wherein the steam rate is from 0.5 to 1.5 lb of steam per gallon of solvent.

7. A process according to claim 6 wherein the carbon dioxide content of the lean recycle absorbent is from 0.2% w to 1.5%.

* * * * *